March 8, 1966 S. O. LINDERHOLM 3,239,599
UNITARY CONNECTOR FOR CABLES AND TRANSFORMERS
Filed April 30, 1963 2 Sheets-Sheet 1
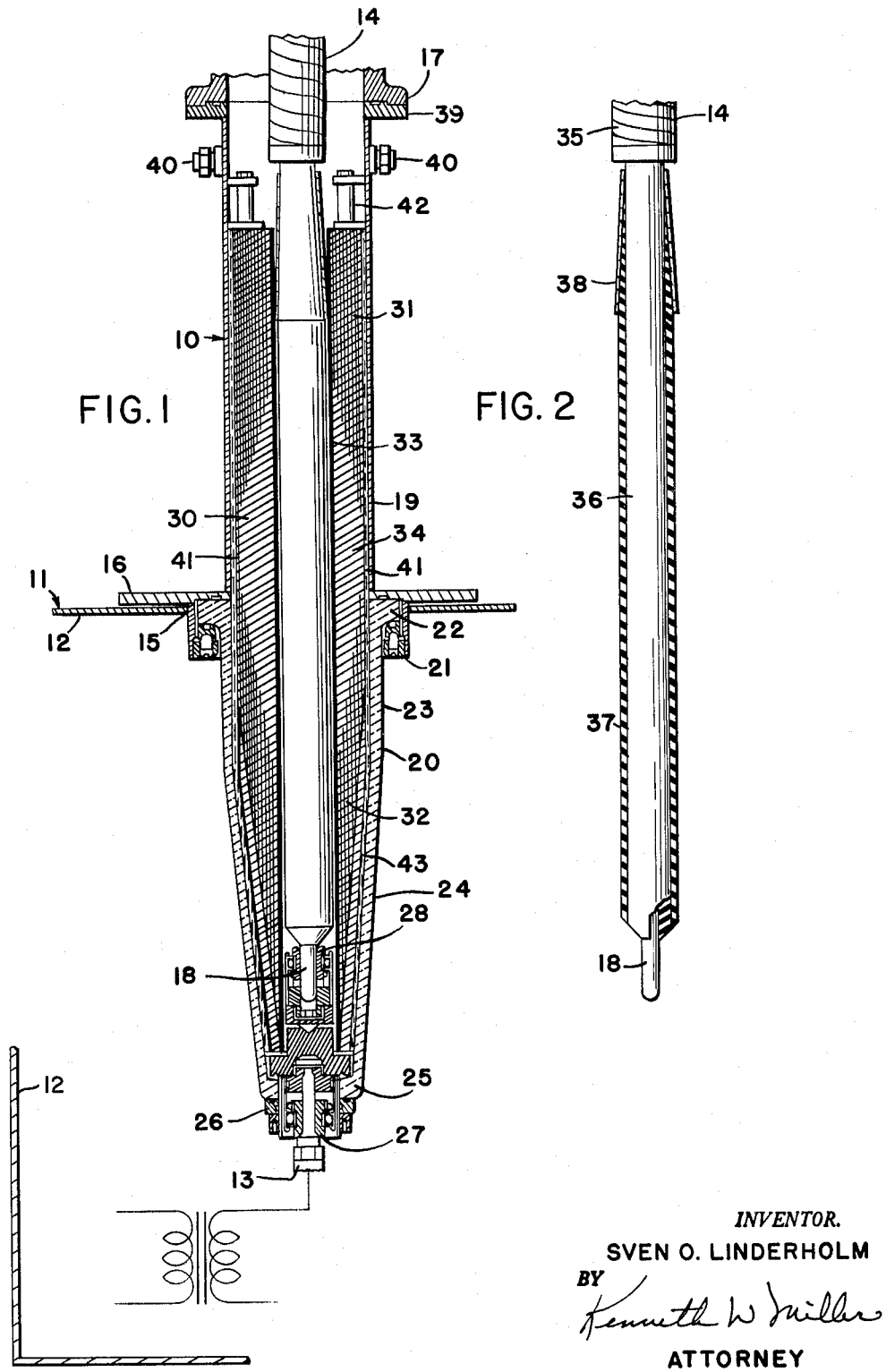
INVENTOR.
SVEN O. LINDERHOLM
BY
Kenneth W. Miller
ATTORNEY United States Patent Office 3,239,599
Patented Mar. 8, 1966

3,239,599
UNITARY CONNECTOR FOR CABLES
AND TRANSFORMERS
Sven O. Linderholm, Ludvika, Sweden, assignor to The
Ohio Brass Company, Mansfield, Ohio
Filed Apr. 30, 1963, Ser. No. 276,919
8 Claims. (Cl. 174—143)

This invention relates to apparatus for connecting high voltage cables to transformers and, more particularly, to a unitary or combined high voltage bushing and high voltage cable terminal.

It is a principal object of the invention to simplify terminal apparatus in combined installations of cables and power transformers.

In transmitting electric power by means of high voltage cables, transformers are required at the extremities of the cable line to accomplish the necessary voltage and impedance transformations. The high voltage transformer requires a high voltage thru bushing, and the cable line requires a terminating device so that interconnection of the cable line may be accomplished by a conductor extending between the electrical terminals of the bushing and the cable terminating device, respectively. Because of the similarity of the requirements for stress control in the bushing and the terminating device, substantially duplicate structures are involved. This leads to unnecessarily high installation costs and, although some saving has been accomplished by using a common housing for the transformer and cable termination, there are certain limitations which prevent the general use of such arrangements.

The present invention relates to a unitary cable connector which functions as a combined bushing and cable terminating device and which is adapted to be received in the transformer housing, in place of a separate bushing, and to receive the end of the cable, in place of a separate terminating device.

The connector comprises a tubular metal body which carries a tubular insulator at one extremity and is mounted on a top wall of the transformer with the insulator extending through an opening into the interior of the transformer. The tubular body extends away from the transformer, as is hereinafter described, and is adapted to receive the extremity of the high voltage cable and to provide mechanical support and electrical connection for the cable. The insulator and body incorporate an electrical conductor for interconnecting the conductor of the cable with the terminal of the transformer winding. Suitable terminal devices or connectors, together with insulation and grading arrangements for distributing the stresses due to the voltage differences between the conducting parts, e.g., the conductor and the body, function to terminate and distribute the stresses in the insulation of the electric cable.

It is an advantage of the invention that the connector permits the use of conventional transformer housings at high voltage cable installations.

Another advantage of the invention is that installation is simplified in that the cable may approach the transformer at any convenient angle or with any convenient disposition.

The invention, together with further objects, features, and advantages thereof, is described in the following detailed specification and claims, taken with the appended drawings in which:

FIG. 1 illustrates one embodiment of the cable connector of the invention;

FIG. 2 is an enlarged view of the end of a cable as prepared for use with the connector of FIG. 1.

Figure 3:
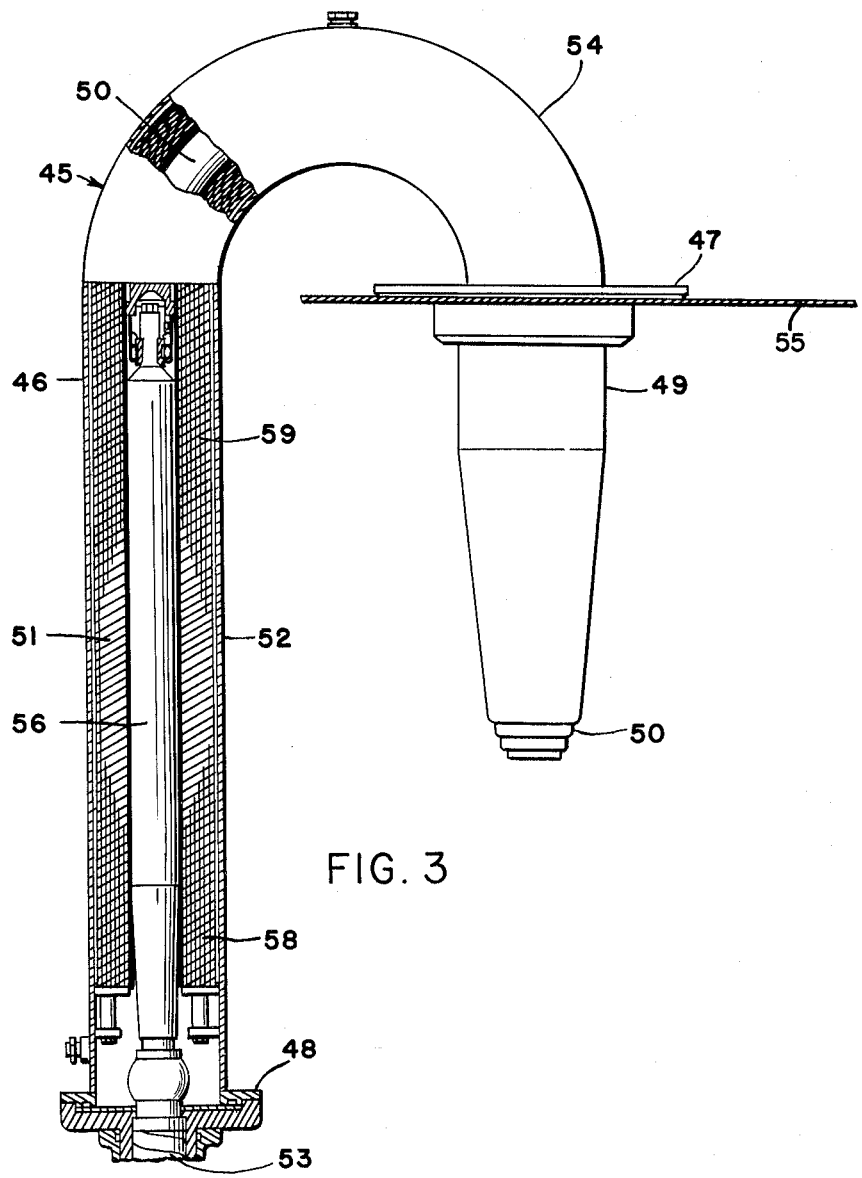
FIG. 3 illustrates a cable connector comprising a second embodiment of the invention.

In FIG. 1 and FIG. 2, the cable connector 10 is shown with a transformer 11, a transformer housing 12, a terminal 13 for the transformer winding, and a cable 14. The connector 10 is received through an opening 15 in a wall of the transformer housing 12 and is supported upon and secured to the wall by means of a mounting flange 16. The cable 14 is secured to the connector 10 by means of a fitting 17. The connector 10 functions in part as a mechanical terminating means for the cable 14 to support the cable and retain the insulating fluid of the cable system, and to provide electrical interconnection between the conductor 18 of the cable and the terminal 13 of the transformer.

The connector 10 comprises a tubular metal part or body 19 which has a circular plate welded to the one extremity thereof to constitute the mounting flange 16. A tubular porcelain insulating part or insulator 20 is carried by the flange 16 and extends into the interior of the transformer 11 to a point adjacent the terminal 13 of the transformer. The insulator 20 is attached to the flange 16 by a retainer device 21, engaged with a shoulder 22 about the interior extremity of the insulator 20. The insulator 20 extends downward and away from the shoulder 22 along a cylindrical part 23 and then along a tapered part 24 which converges inwardly to a shoulder 25 at the extremity of the part. A thru conductor 26 extends from the interior to the exterior of the insulator 20 and is secured to the shoulder 25 by suitably interengaged parts, threaded or otherwise fastened together. The conductor 26 is constructed at the outer end with a terminal device or contact 27, engaged with the terminal 13, and is constructed at the inner end with a terminal device or contact 28, engaged with the conductor 18.

The connector 10 is provided with sealing means between the insulator 20 and the flange 16 and between the insulator 20 and the conductor 26 for retaining the insulating oil of the cable system against the pressure of the oil in the system, as is known in the art.

A tubular core 30, received within the body 19 and insulator 20 of the connector 10, functions to insulate the cable conductor and to distribute electric stresses in the region between the end of the sheath of the cable and the body 19. The core 30 comprises a cylindrical winding of insulating paper embodying stress distributing foils 31 adjacent the outer extremity of the core and the cable, and grading foils 32 adjacent the inner extremity of the core and between the body 19 and the conductor 26. The core 30 is constituted with a rigid inner tube 33, a surrounding winding of insulating paper 34, and intercalated sheets of conducting material between the turns of the winding to form the foils 31 and 32.

The cable 14 comprises the conductor 18, a metallic sheath 35, and a body of insulation 36 coaxially between the conductor 18 and the sheath 35. The cable 14 is specially prepared along that portion of the cable received within the core 30 and has the insulation 36 covered by a cylindrical body of insulation or build-up 37 to provide increased insulation strength. A stress cone 38 comprising a winding of conducting material along a tapered portion of the build-up 37 provides a ground transition or screen from the sheath 35 to the core, as is known in the art.

The cable 14 is secured to the body 19 of the connector 10 by means of the fitting 17 which is secured to a cable flange 39, attached to the body 19 at the adjacent end thereof. The fitting 17 is compressively engaged with the exterior of the cable 14 and positions and supports the cable with respect to the end of the body 19. Suitable fluid sealing means are provided to retain the insulating oil of the cable system, and fittings 40 are provided for connecting the connector 10 to the system.

The foils 31 provide a ground transition between the stress cone 38 of the cable and the body 19 of the connector 10. The foils 32 cooperate with an outermost foil 41 to distribute the electric stresses in the insulation of the cable 14, the build-up 37, and the core 30. The outermost foil 41 extends along the core and exteriorly about the foils 31 and the foils 32, and is connected with the foils 31 to the body 19 through a conductor 42. A layer of paper or other insulating sheet material 43 is provided between the core 30 and the interior surface of the body 19 and the interior surface of the insulator 20. The foils 31 may be constituted as concentric sheets of conducting material of increasing length in proceeding radially outward from the cable, connected together to define a ground surface along the longitudinally central part of the core. Alternately, the foils 31 may be constituted as a continuous length of strip material wound with the paper and spaced progressively from the end of the paper, all as described in my United States Patent 3,005,868.

The foils 32 comprise a succession of sheets of conducting material arranged between successive turns of the paper of the core 30 to constitute separate coaxial cylindrical conducting surfaces. The foils provide a capacitive grading of the stresses in the body of the core 30 in the region between the body 19 and the conductor 26 at the end of the insulator 20. The length of the individual coaxial foils is preferably decreased in proceeding radially outward from the conductor 26 toward the outermost foil 41 to provide a desirable distribution of electric stresses in the insulation adjacent the foils.

In FIG. 3, the cable connector 45 comprises a tubular metal body 46, a mounting flange 47, a cable flange 48, an insulator 49, a conductor 50, and a core 51, all corresponding to the parts 19, 16, 39, 20, 26 and 30, respectively, of the connector 10. The tubular body 46 comprises a straight part 52 for receiving the end of the cable 53 and a curved part 54 between the part 52 and the flange 47 and insulator 49. The radius and angle of curvature of the part 54 is determined by the relation of the cable 53 to the transformer 55. The arrangement of FIG. 3 incorporates a 180 degree bend for reversing direction in going from the cable to the terminal of the transformer winding. The body 46 may comprise a continuous tubular piece as shown in FIG. 3, or may be formed or assembled in several pieces.

The core 51 extends along the interior of the part 52 of the body 46 between that part and the prepared end 56 of the cable 53, through the curved part 54 of the body 46, and through the insulator 49 to the end of the conductor 50. The core 51 is constructed with generally the same foil arrangement as the core 30, including the foils 58 corresponding to the foils 31 and the foils 59 corresponding to the foils 32. The foils 58 are constructed in the same way and provide the same transition between the ground sleeve of the cable end 56 and the straight part 52 of the body 46 as the foils 31 between the ground sleeve 38 of the cable 35 and the body 19 of the connector 10, in FIG. 1.

The grading foils 59 function substantially in the same way as the grading foils 32, but due to the distance along the curved part of the connector 45, a somewhat different construction of the paper and foils is required. To this end, the successive layers of paper of the core 51 are formed by winding ribbons of paper helically along the conductor 50. Similarly, each of the coaxial cylindrical layers of conducting material is formed by winding strips of conducting material over and along the preceding layer of paper. Because of the labor involved in preparing the core 51, the longitudinally extending concentric principal elements of the foils 59 may have a greater spacing in the radial direction of the core than the corresponding elements in the core 30, but with shorter stress distributing conducting elements between the principal elements.

One result of the invention is that the advantages of combining the cable terminating and transformer bushing means in a single device are achieved while avoiding the problems of sealing the transformer housing against the pressure of the cable system.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. Electrical apparatus comprising a transformer, a cable, and unitary interconnecting means for the transformer and the cable comprising a tubular insulating part extending into the transformer, a tubular conducting part adjacent to and in axial alignment with the insulating part and extending along and about a conductor of the cable, a thru conductor carried by the insulating part extending from the interior to the exterior of the insulating part and connected to the conductor of the cable and to a conductor of the transformer, tubular insulating means arranged within the tubular members and having a central opening with the cable conductor received therein, and conductive means embodied in the said insulating means for distributing electric stresses in the radial and longitudinal directions about the cable conductor from the conductor to the tubular conducting part and from the tubular conducting part to the thru conductor.

2. In combination, electrical apparatus comprising in part a housing and a terminal for a device within the housing and means for connecting a power cable outside the said housing to the terminal comprising a tubular metal part having a circumferentially extending flange adjacent one extremity thereof, a rigid tubular insulating part attached to said tubular metal part and the said flange at the said one extremity of the tubular metal member, the flange attached to a wall of the said housing, the tubular metal part extending outwardly from the housing and the tubular insulating part extending into the interior of the said housing, a tubular core of sheet insulating material embodying longitudinally and circumferentially extending foils received within the said tubular parts and having a central opening for receiving a conductor of the said cable, and conductor and terminal means at the extremity of the said insulating part remote from the metal part extending from the exterior to the interior of the insulating part and connected on the exterior to the said terminal and adapted for connection on the interior to the conductor of the cable.

3. In combination, an electrical apparatus housing, an operative electrical device in the housing, and a cable connector comprising a tubular metal member having a circumferentially extending mounting flange adjacent one extremity thereof and a cable flange adjacent the remaining extremity thereof, a rigid tubular insulating member carried from the extremity of the tubular metal member and the mounting flange in axial alignment therewith, the said housing having the insulating member received through an opening in the wall and the mounting flange secured to the wall in fluid-tight relation thereto, a terminal device comprising a thru conductor carried at the extremity of the insulating member extending from the interior to the exterior of the insulating member in fluid-sealed relation thereto and connected to the said operative device, a tubular core of insulating material embodying longitudinally and circumferentially extending capacitive grading foils between the tubular metal member and the terminal device, and ground foils between the end of the tubular metal member away from the housing and the wall of the member, the said tubular core having a central opening for receiving a cable conductor and insulation therefor, all for connecting a power cable to the housing and to the electrical device in fluid separate electrically connected relation thereto.

4. A connector for electrically and mechanically interconnecting a transformer and a power cable comprising a tubular metal part, a tubular insulating part carried from the metal body at one extremity thereof in axial alignment therewith, a circumferentially extending mounting flange on the said one extremity of the tubular metal body, a conductor extending through the said insulating part at the extremity thereof away from the metal part with fluid sealing means between the conductor and the insulating part, terminal means for the said conductor on the exterior of the insulating part for connection to the transformer, a hollow tubular core of insulating material extending along the interior of the said tubular parts from adjacent the said conductor to adjacent the remaining extremity of the metal part, and terminal means for the conductor on the interior of the said insulating part and of the said core for connection to a cable received within the core, foil means in the said core tapered outward in the longitudinal direction of the core from the said remaining extremity of the metal part toward the flange and in the radially outward direction from the interior of the core for a ground transition to the metal part adjacent the flange thereof, and grading means comprising a plurality of concentric cylindrical foils arranged in electrically insulated and overlapping relation between the said conductor and interior terminal means and a ground surface adjacent the metal part.

5. A connector in accordance with claim 4 with means at the said one extremity of the metal part for connection to a transformer housing, and means at the remaining extremity of the metal part for connection to the power cable in fluid sealed relation therewith.

6. A connector in accordance with claim 5, in which the metal part is straight along its length for use in power installations in which the cable is directed toward the transformer.

7. A connector in accordance with claim 5, in which the metal part has a curved part for use in power installations in which the cable is directed away from the transformer.

8. A connector in accordance with claim 7, in which the foils of the grading means are constituted by helically wound ribbons of conducting material and the core is constituted by helically wound strips of paper, all about the conductor in the curved portion of the metal body.

References Cited by the Examiner

UNITED STATES PATENTS

| | | | |
|---|---|---|---|
| 1,777,071 | 9/1930 | Burnham | 174—18 |
| 1,873,977 | 8/1932 | Naef | 174—18 X |
| 2,924,641 | 2/1960 | Priaroggia | 174—143 X |
| 3,005,868 | 10/1961 | Linderholm | 174—73 |
| 3,005,968 | 9/1962 | Spiece | 174—31 |

FOREIGN PATENTS 1,241,785   8/1960   France.

JOHN F. BURNS, *Primary Examiner.*

JOHN P. WILDMAN, E. JAMES SAX, *Examiners.*